March 19, 1940.                J. QUAGLIA                 2,194,056

RECOVERY OF SILVER FROM WASTE HYPOSULPHITIC LIQUIDS

Filed April 8, 1939

INVENTOR:
JACQUES QUAGLIA
BY: Haseltine, Lake & Co.
ATTORNEYS

Patented Mar. 19, 1940

2,194,056

UNITED STATES PATENT OFFICE 2,194,056

RECOVERY OF SILVER FROM WASTE HYPOSULPHITIC LIQUIDS

Jacques Quaglia, Thonon - les - Bains, Savoy, France, assignor to Th. Muhlethaler S. A., Nyon, Switzerland, a corporation of Switzerland Application April 8, 1939, Serial No. 266,924
In France April 15, 1938

4 Claims. (Cl. 75—109)

The recovery of the silver contained, in the form of soluble salts, in waste liquids resulting from the fixing of photographic negatives and prints has already been propounded, for these liquids, once spent from the photographic point of view, contain very variable quantities of silver, varying on an average from 0.7 to 7 gr. of silver per litre.

Processes have already been proposed for this recovery, consisting in precipitating the silver into its metallic state by means of a metal more electro-positive than silver, for instance copper. Hitherto for this precipitation, said more electro-positive metal has been used in a form having a large surface, for instance in the form of thin foils or of filings. The use of said metal in such forms has the disadvantage of making the contact between the liquid to be treated and said metal difficult; in fact, the thin foils are apt to stick to each other or to the walls of the vessel in which the treatment is effected, and this greatly diminishes the effective surface of same; the filings rapidly form with the precipitated silver a dense mass which the liquid to be treated finds it difficult to permeate.

It has been established according to the present invention, that these difficulties are overcome when the more electro-positive metal is used in the form of an elastic mass which is made of entangled filiform elements and which, besides being very permeable has, compared with its weight, a large surface of contact for the liquid, that is to say in the form of fine or coarse steel wool.

This invention therefore comprises a process for the recovery of the silver contained, in the form of soluble salts, in waste hyposulphitic liquids and an apparatus for working this process.

The latter consists, like the processes known and described above, in precipitating the silver into its metallic state by means of at least one metal more electro-positive than the silver itself. It is, however, characterized by the fact that, for this precipitation, said more electro-positive metal is used in the form of an elastic mass, which is made up of entangled filiform elements, and which besides being very permeable has, compared with its weight, a large surface of contact for the liquid. As a metallic mass, fine or coarse metallic wool can be used to advantage, for instance metallic wool made of iron, steel or copper, etc.

A mass made up of fine or coarse iron, steel or copper wool has in fact the following peculiar qualities, making its use very advantageous for the precipitation of silver from waste hyposulphitic liquids used in photography:

(1) It precipitates very well the silver from its saline solutions, particularly from its slightly acid hyposulphitic solutions.

(2) It has a very large effective surface compared with its volume and weight (for instance a mass of steel wool of quality sufficiently good for the recovery of silver has an effective surface of between 20 to 25 square metres per kg.).

(3) Its elasticity is good, hence it always occupies about the same visible volume and thereby presents at all times a large surface for the reaction of the liquid.

(4) It has, even fairly densely compressed, a very good porosity allowing the passage or the draining of liquids through same and this even in the case when said liquids have in suspension a certain percentage of insoluble substances (case of alum containing baths).

From the foregoing will be seen the advantages derived from the use of coarse and fine metallic wool for the recovery of silver from hyposulphitic solutions compared with the use of powders, filings, wires, scraps, etc., hitherto used for the same purpose.

By way of illustration, there may be given the following example of the application of the process according to the invention for the recovery of the silver to be found in spent hyposulphitic baths.

The spent liquid containing dissolved silver salts is made to pass through a mass of steel wool. The silver precipitates on the steel and the latter goes into solution. Once the liquid has passed through the wool it is sent down the drain; the wool is charged with elementary silver. By controlling the increase in weight of the mass of metallic wool, the quantity of precipitated silver is measured (a loss of 56 grs. of iron corresponds theoretically to a precipitation of 216 grs. of silver). When the metallic mass contains between 60 to 75% of silver, the circulation of the liquid is stopped and the mass is dried.

The latter is then melted in a crucible, by using known fluxes (borax, glass-dust, etc.) and this yields without any other treatment ingots of silver assaying from 94 to 98% of silver.

The refining of this silver which is so necessary may be effected by fusion or by electrolysis.

The apparatus for working the process according to the invention is characterized in that it comprises a receptacle provided with a device for the admission and a device for the evacuation of a liquid, said receptacle containing a metal which is more electro-positive than silver, in the form of an elastic mass which is made up of entangled filiform elements and which besides being very permeable has, compared with its weight, a large surface of contact for the liquid. This mass may be made of fine or coarse metallic wool.

The apparatus is advantageously completed with an outflow regulator, in order to give to the current of liquid flowing through it a rate of flow adapted for a complete precipitation of all the silver contained therein.

The accompanying drawing shows, by way of example, an embodiment of an apparatus specially intended for the recovery of the silver in spent baths used in photography, directly at the photographer's.

Figure 1:
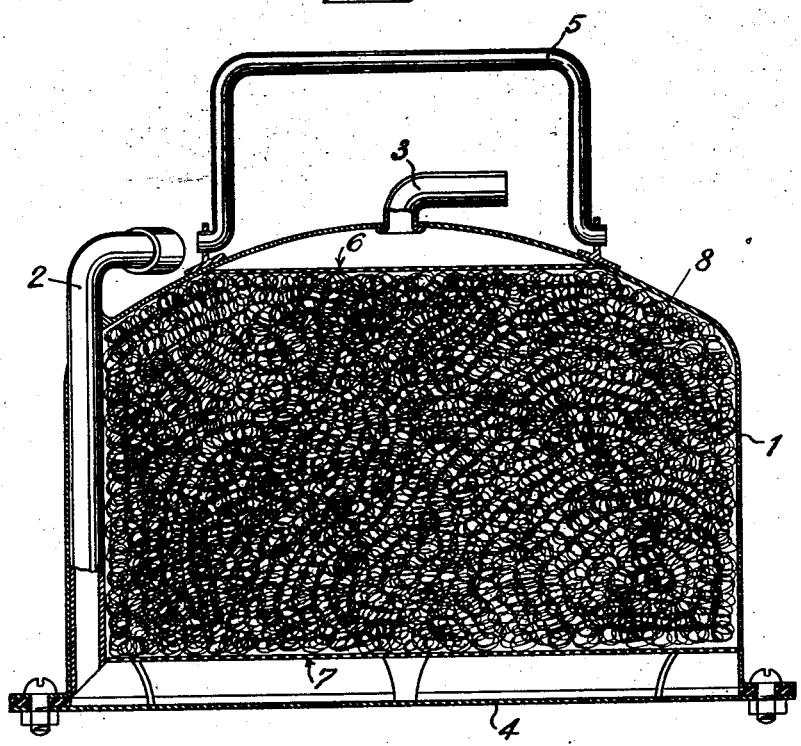
Figure 1 is a vertical section through the apparatus.
Figure 2:
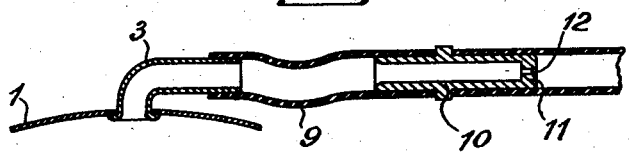
Figure 2 is a section through an outflow regulator.

The apparatus shown comprises a receptacle 1 made of a material which is as far as possible unattacked by hyposulphitic baths, at the bottom of which opens out a pipe 2 for the admission of a liquid and at the top of which is fixed an evacuation pipe 3.

The receptacle 1 is closed by a removable bottom 4 and is provided with a handle 5 for its handling; it comprises inside two removable grids 6 and 7, between whch is located a compressed mass of metallic wool 8.

The pipe 3 is connected by means of a rubber tube 9 with an outflow regulator 10. The latter consists of a single cylinder, for example, made of ebonite, having a diaphragm 11 at one end, bored with a calibrated hole 12.

The apparatus shown works as follows:

The pipe 2 is connected with the tank containing spent bath, the pipe 3 leads to the drain by means of the outflow regulator 10. The receptacle is provided with new fine or coarse metallic wool. The receptacle full of liquid is weighed at the beginning of the operation. The spent baths from which it is desired to recover the silver are made to pass through it. Once the increase in weight of the receptacle is sufficient, it is disconnected, the bottom 4 is removed and the metallic mass 8 is taken out. The latter appears in the form of an entanglement of friable metallic filaments having when dry from 60 to 75% silver-contents. The apparatus is recharged with new fine or coarse metallic wool and the operation can be recommenced immediately.

It may be indicated that an apparatus having a capacity of about 3–5 litres with a charge of about 0.52 kg. of steel wool of fairly good quality recovers substantially up to 1.4 kg. of silver. Once the outflow is regulated to about 25 litres per hour, the recovery is from 86 to 92% of the total amount of silver contained in the hyposulphitic solutions treated. To recover nearly the whole amount of the silver, recourse may be had either to a reduction of the outflow per hour of the hyposulphitic solution, or to the use in the apparatus of a coarse or fine metallic mass of greater effective surface, that is to say of better quality, or to the putting in series of a second apparatus or finally to the use of an apparatus of greater capacity.

The apparatus just described can be used by photographers, it is simple, not bulky, light and efficient, practical and rapid, and makes it possible to recover economically the silver in hyposulphitic solutions.

What I claim is:

1. In the process for the recovery of silver contained in the form of soluble salts in waste hyposulphitic liquids, including precipitation of the silver into a metallic state by means of at least one metal that is more electro-positive than silver, the step which consists in using as a precipitant an elastic mass made up of a plurality of entangled filiform elements of said metal and which is very permeable and, compared with its weight, has a very large surface of contact for the liquid.

2. In the process for the recovery of silver contained in the form of soluble salts in waste hyposulphitic liquids, including precipitation of the silver into a metallic state by means of at least one metal that is more electro-positive than silver, the step which consists in using as a precipitant an elastic mass made up of a plurality of elements of a ferrous metal which are filiform and entangled, said mass being very permeable and having a surface of contact ranging from 15 to 20 m.$^2$ per kilogram of metal.

3. In the process for the recovery of silver contained in the form of soluble salts in waste hyposulphitic liquids, including precipitation of the silver into a metallic state by means of at least one metal that is more electro-positive than silver, the step which consists in using as a precipitant an elastic mass made of a plurality of entangled filiform elements of steel, said mass being very permeable and having a surface of contact ranging from 15 to 20 m.$^2$ per kilogram of metal.

4. The process according to claim 1, wherein the metal forming the filiform elements comprises copper.

JACQUES QUAGLIA.